(12) United States Patent
Kim

(10) Patent No.: US 8,259,083 B2
(45) Date of Patent: Sep. 4, 2012

(54) MOBILE DEVICE HAVING BACKPANEL TOUCHPAD

(75) Inventor: Ki-Wan Kim, Seoul (KR)

(73) Assignees: Do-Hyoung Kim, Gyeonggi-Do (KR); Innodigital Co., Ltd., Gyeonggi-Do (KR)

( * ) Notice: Subject to any disclaimer, the term of this patent is extended or adjusted under 35 U.S.C. 154(b) by 422 days.

(21) Appl. No.: 12/503,314

(22) Filed: Jul. 15, 2009

(65) Prior Publication Data

US 2010/0020034 A1    Jan. 28, 2010

(30) Foreign Application Priority Data

Jul. 25, 2008   (KR) .................... 20-2008-0009915 U

(51) Int. Cl.
*G09G 5/00*    (2006.01)
(52) U.S. Cl. ........................................ 345/173; 345/156
(58) Field of Classification Search .................. 345/156, 345/169, 173, 174
See application file for complete search history.

(56) References Cited

U.S. PATENT DOCUMENTS

| | | | |
|---|---|---|---|
| 5,729,219 A * | 3/1998 | Armstrong et al. | 341/20 |
| 7,123,243 B2 * | 10/2006 | Kawasaki et al. | 345/173 |
| 7,800,592 B2 * | 9/2010 | Kerr et al. | 345/173 |
| 2007/0103454 A1 | 5/2007 | Elias | |

FOREIGN PATENT DOCUMENTS

| | | |
|---|---|---|
| KR | 2003-0042682 | 6/2003 |
| KR | 10-2009-0052243 | 5/2009 |

\* cited by examiner

*Primary Examiner* — Duc Dinh
(74) *Attorney, Agent, or Firm* — Greenblum & Bernstein, P.L.C.

(57) ABSTRACT

The present invention relates to a mobile device having a backpanel touchpad, and more particularly, to a technique for enabling cursor movements and execution instructions on a frontpanel display screen to be inputted through a touchpad positioned at a backpanel of a mobile device. Accordingly, a touchpad is disposed on a back side of a mobile device, so that the mobile device can be controlled through a contact point at which a user's finger is naturally positioned when a user holds the mobile device with a user's hand. Further, a backpanel touchpad is operated, so that a display screen is not covered with the user's finger.

4 Claims, 6 Drawing Sheets

MOBILE DEVICE HAVING BACKPANEL TOUCHPAD

BACKGROUND OF THE INVENTION

1. Field of the Invention

The present invention relates to a mobile device having a backpanel touchpad, and more particularly, to a technique for enabling cursor movements and execution instructions on a frontpanel display screen to be inputted through a touchpad positioned at a backpanel of a mobile device.

2. Description of the Related Art

Mobile devices using a touchscreen manner are widely used. In the touchscreen input manner, input buttons are replaced with a touchscreen positioned at a front side, and a user can move a cursor, operate a menu or input an execution instruction by touching a virtual button displayed on the touchscreen. Such a touchscreen has advantages in that a screen of a terminal can be widely used, and the terminal can be simplified to thereby make the shape of the terminal slim.

On the other hand, the touchscreen manner also has disadvantages. Since a user's finger is in contact with a display screen, the display screen is covered with the user's finger, and thus, due to the optical illusion with the display, it is difficult to allow the user's finger to be in contact with the display screen as the user is intended. In full-browsing web services, a plurality of menus are densely displayed on a display screen, but the area of a user's finger in contact with the display screen is broad, so that when menus are selected, errors may frequently occur.

SUMMARY OF THE INVENTION

An object of the present invention is to provide a technique for enabling users to easily operate mobile devices.

In one embodiment, the present invention provides a mobile device, which comprises a frontpanel display disposed on the front side of the mobile device for providing display on a screen; a backpanel touchpad disposed on the back side of the mobile device, the backpanel touchpad receiving cursor movements and execution instructions through touch operations; and a controller for displaying a cursor on the frontpanel display, whose operations are provided by touch operation on the backpanel touchpad, wherein the controller receives an execution instruction on the backpanel touchpad so as to process the execution instruction corresponding to the cursor position of the execution instruction on the frontpanel display.

According to one aspect of the present invention, the backpanel touchpad is disposed at both ends of the back side.

In other embodiment, the present invention provides a mobile device, which comprises a frontpanel touchscreen disposed on the front side of the mobile device, the frontpanel touchscreen having image display function and touchpad function; a backpanel touchscreen disposed on the back side of the mobile device, the backpanel touchscreen having image display function and touchpad function; and a controller for displaying a cursor on the frontpanel touchscreen whose cursor operations are provided on the backpanel t touchscreen and for receiving an execution instruction on the backpanel touchscreen so as to process the execution instruction corresponding to the cursor position of the execution instruction on the frontpanel touchscreen, the controller for displaying a cursor on the backpanel touchscreen whose cursor operations are provided on the frontpanel touchscreen and for receiving an execution instruction on the frontpanel touchscreen so as to process the execution instruction corresponding to the cursor position of the execution instruction on the backpanel touchscreen.

According to another aspect of the present invention, the controller alternately switches the functions of the frontpanel and backpanel touchscreens, wherein when the controller inactivates the touchpad function with activating the display function for one touchscreen, the controller activates the touchpad function with inactivating the display function for the other touchscreen.

DETAILED DESCRIPTION OF THE INVENTION

Figure 1:
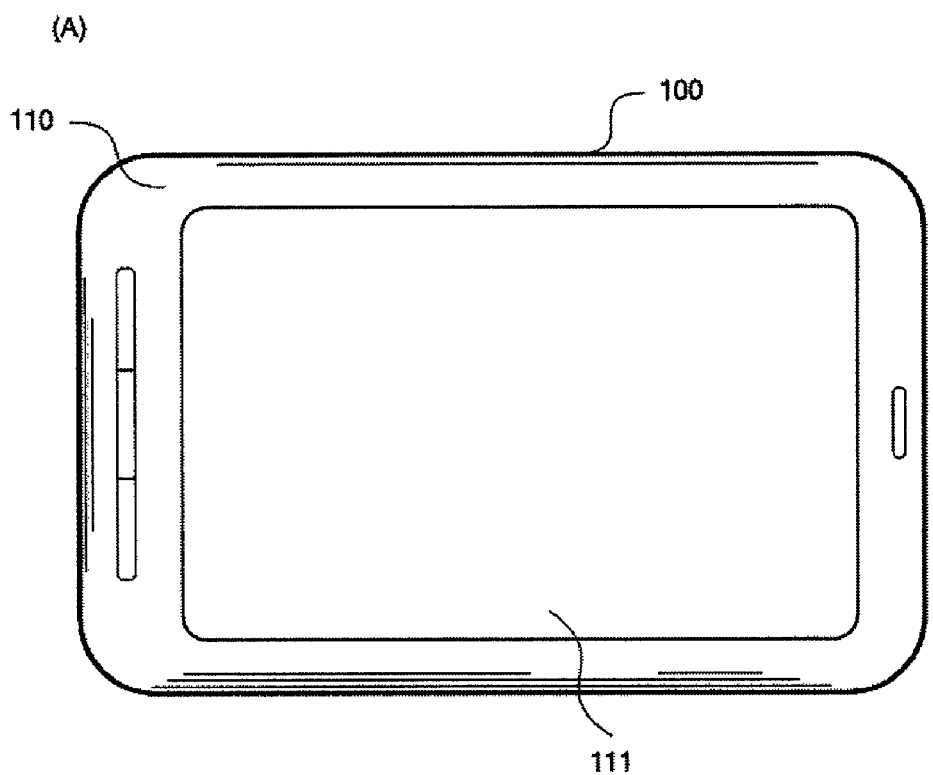
FIG. 1 is a view showing the entire configuration of a mobile device having a backpanel touchpad according to the present invention.
Figure 1:
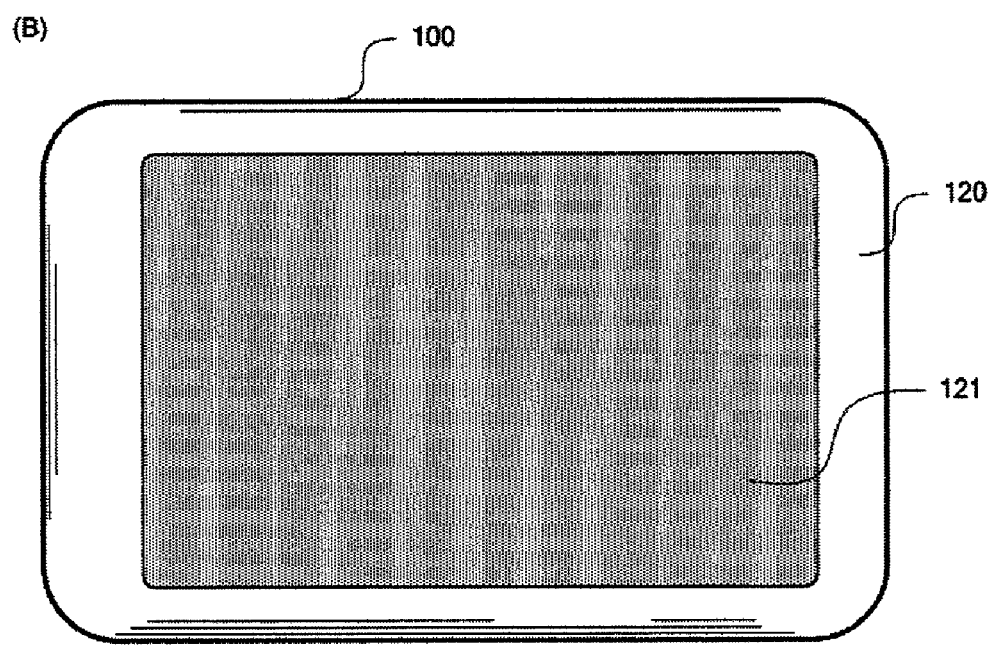

FIG. 1 shows a mobile device 100 according to the present invention, wherein FIGS. 1 (A) and (B) show a front side 110 and a back side 120, respectively. The mobile device 100 comprises a digital device, such as a mobile phone, a PDA and a PMP.

A frontpanel display 111 is positioned on the front side of the mobile device 100 and allows images to be displayed on a screen. Preferably, a liquid crystal display is used as the frontpanel display 111.

A backpanel touchpad 121 is disposed on the back side 120 of the mobile display 100. A user may allow a cursor to move by touching the backpanel touchpad 121 with a user's finger, and allow an execution instruction to be inputted through a double click. The backpanel touchpad 121 is used to control a screen displayed through the frontpanel display 111. That is, when the user moves a finger with touching the backpanel touchpad 121, a controller (not shown) detects the movement and controls the position of the cursor to move on the frontpanel display 111 corresponding to the movement on the backpanel touchpad 121. If the user performs a double click on the backpanel touchpad 121, the controller detects the double click and processes an instruction based on the current position of the cursor on the frontpanel display 111. For example, in case of menu selection, the user may allow the cursor to be moved to a specific menu through the backpanel touchpad 121 while viewing a menu screen of the frontpanel display 111 and then select the specific menu. The operation of the backpanel touchpad 121 will be described in detail with reference to FIGS. 2 and 3.

In FIG. 1, the backpanel touch panel 121 is disposed on the back side 120 to correspond to the frontpanel display 111 in size and position. The controller matches the front and back sides 110, 120 so that the cursor is displayed at a point on the screen of the frontpanel display 111 corresponding to a touch position of the backpanel touchpad 121. In the user's view-point, the touch position of the backpanel touchpad 121 is almost identical to the position of the cursor on the frontpanel display 111. The backpanel touchpad 121 may be formed smaller than the frontpanel display 111, which will be described later with reference to FIGS. 4 and 5.

Figure 2:
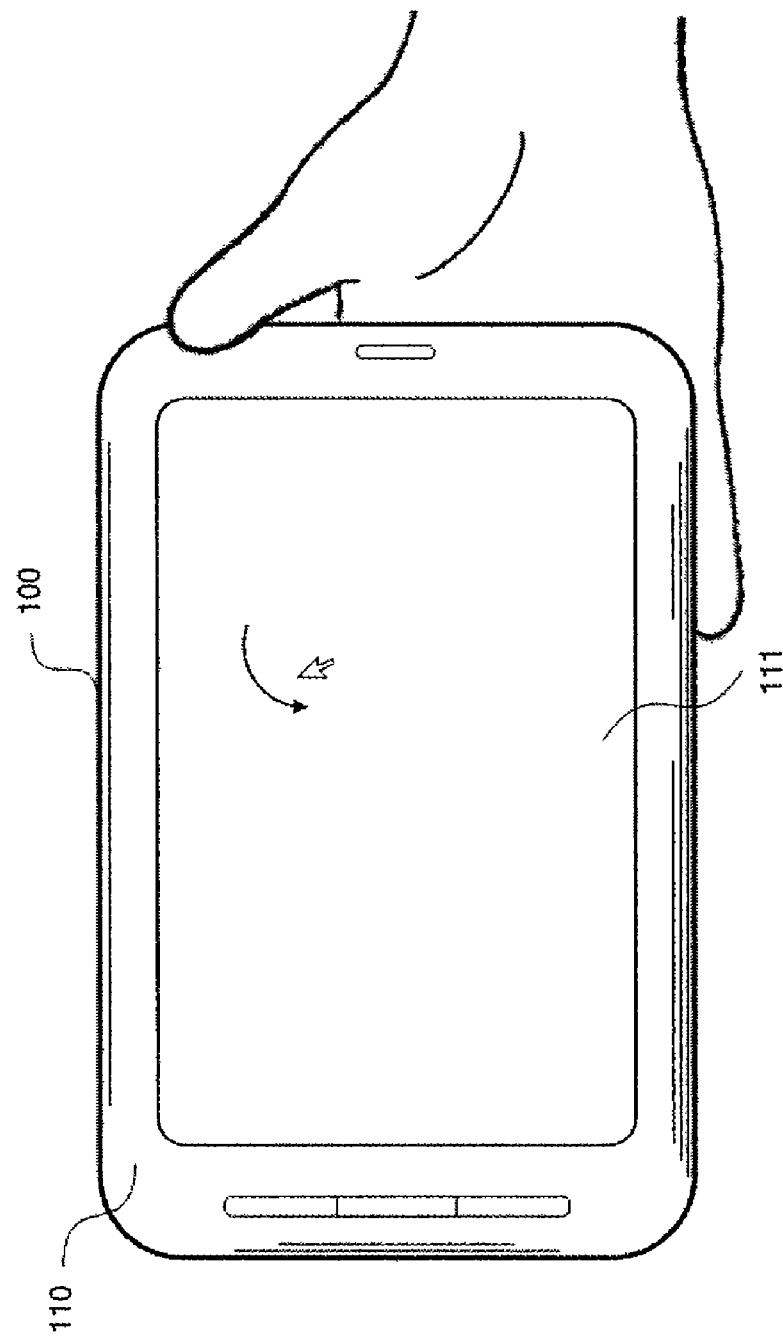
FIG. 2 is a view showing a mouse cursor that moves on a frontpanel display as a user operates the backpanel touchpad.
Figure 3:
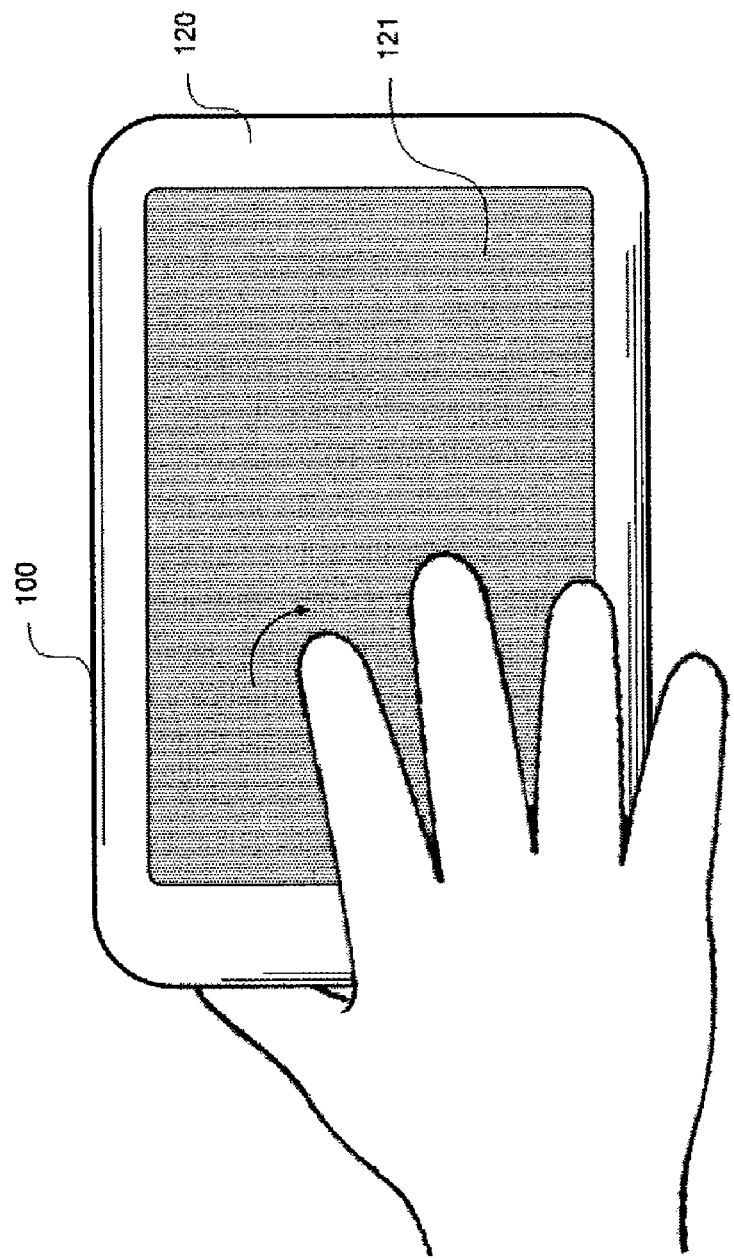
FIG. 3 is a view showing that a user operates the backpanel touchpad.

FIGS. 2 and 3 show that a mouse cursor moves on the frontpanel display 111 as the user operates the backpanel touchpad 121. When the user holds the mobile device 100, his or her fingers except the thumb face the back side 120 of the mobile device 100, and accordingly, the backpanel touchpad 121 can be naturally operated. The user allows the cursor to be moved by touching the backpanel touchpad 121 with a user's finger (e.g., forefinger) while viewing the screen through the frontpanel display 111.

As compared with a prior art in which the frontpanel display 111 is implemented as a touchscreen, the present invention makes it possible to delicately control the position of the cursor and to easily operate the mobile device 100 while holding the mobile device 100 with a user's hand without covering a screen of the mobile device 100. That is, in the prior art, the frontpanel display is directly touched to select a menu, resulting in the considerably inaccurate operation as described-above. On the other hand, according to the present invention, the cursor is moved through the backpanel touchpad 121, so that a menu can be delicately and accurately selected. Such an advantage is particularly important in the full-browsing web services.

Figure 4:
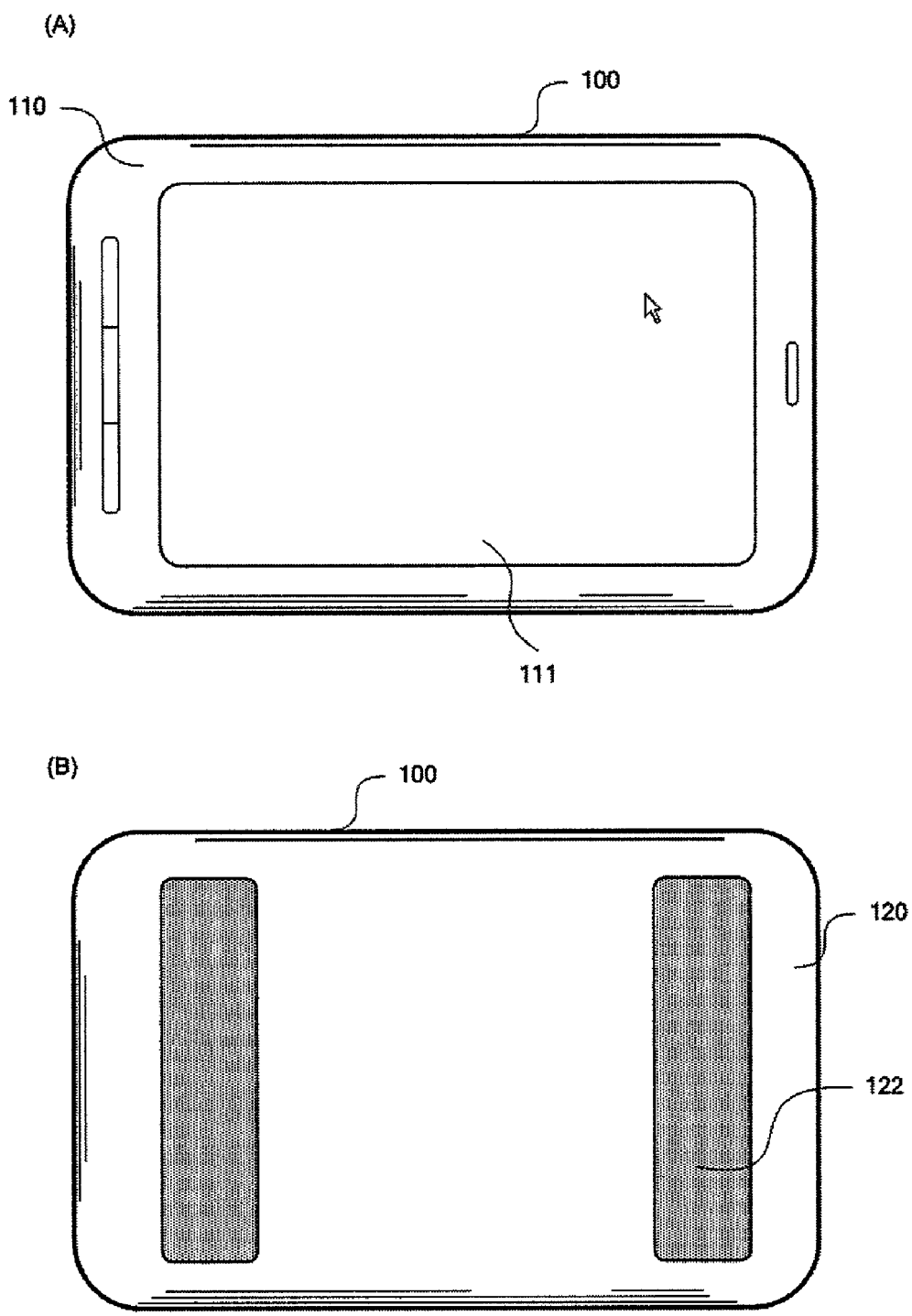
FIG. 4 is a view showing an embodiment in which backpanel touchpads are respectively disposed at both ends of a back side of the mobile device.

FIG. 4 is a view showing an embodiment in which backpanel touchpads 122 are respectively disposed at both ends of the back side of the mobile device 100. The backpanel touchpads 122 are disposed at respective portions of the back side 120. A controller (not shown) allows the cursor to be displayed on the frontpanel display 111 with a touch path on the backpanel touchpads 122 enlarged. The backpanel touchpads 122 are respectively disposed at both ends of the back side 120, so that the user can operate the backpanel touchpads 122 while holding the mobile device 100 with both hands.

Figure 5:
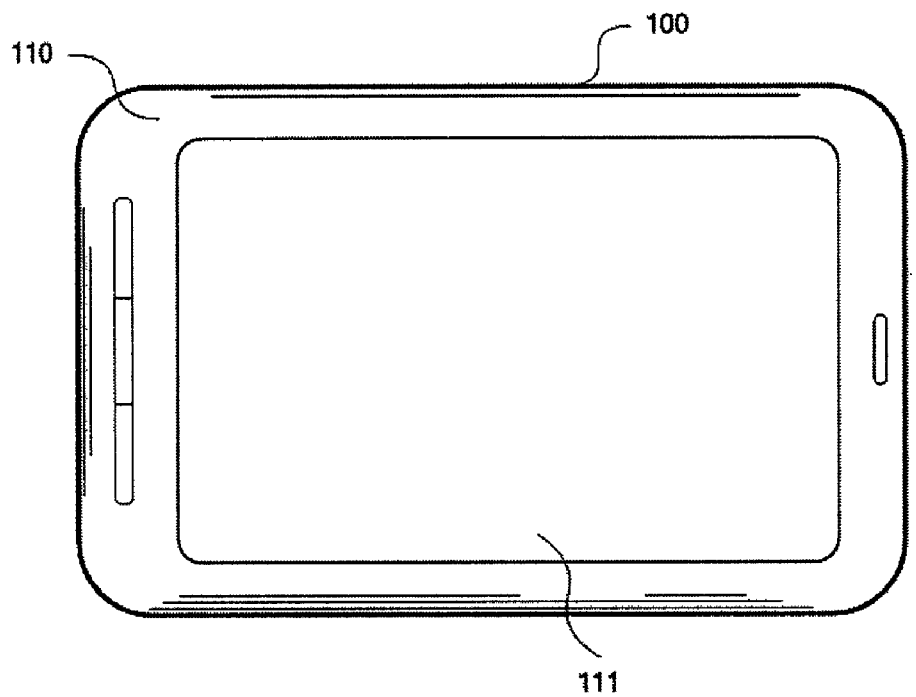
FIG. 5 is a view showing an embodiment in which a backpanel touchpad is disposed at a corner of the back side of the mobile device.
Figure 5:
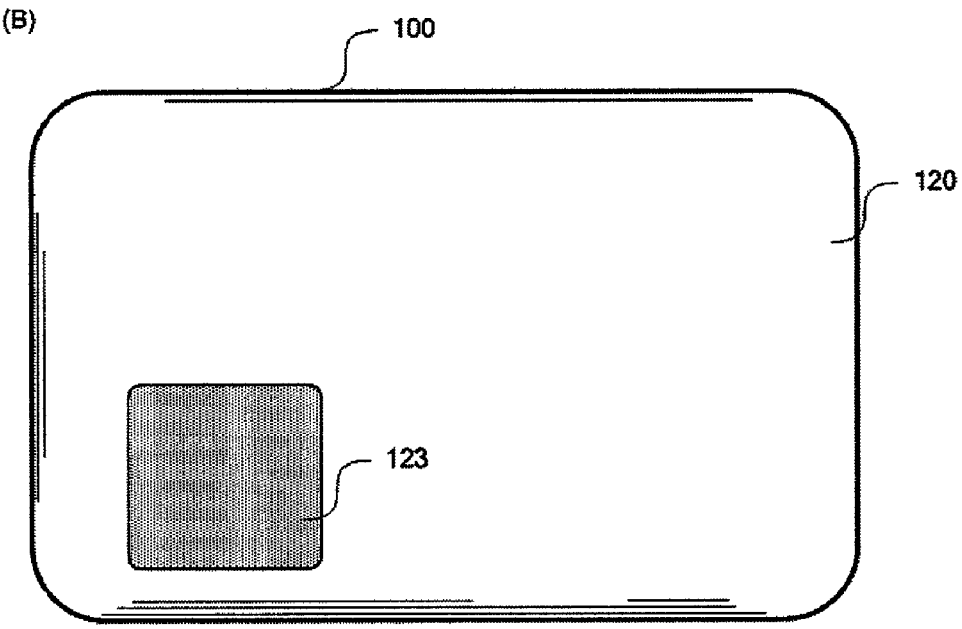

FIG. 5 is a view showing an embodiment in which a backpanel touchpad 123 is disposed at a corner of the back side of the mobile display 100. The backpanel touchpad 123 is disposed at a right lower corner of the back side 120, and the user can operate the backpanel touchpad 123 while holding the mobile display 100 with a right hand. The backpanel touchpad 123 may be disposed at any position of the back side 120, and a plurality of backpanel touchpads 123 may be disposed. A cursor control and a screen control (e.g., screen scrolls) may be performed through the backpanel touchpad 123.

Figure 6:
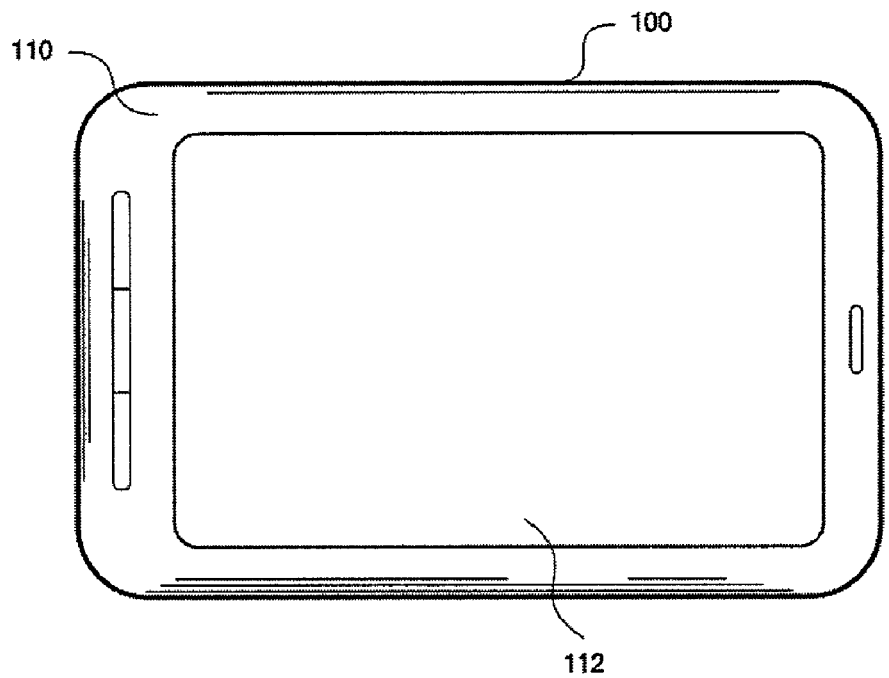
FIG. 6 is view showing an embodiment of a mobile device having touchscreens respectively disposed on both sides thereof to control their opposite displays.
Figure 6:
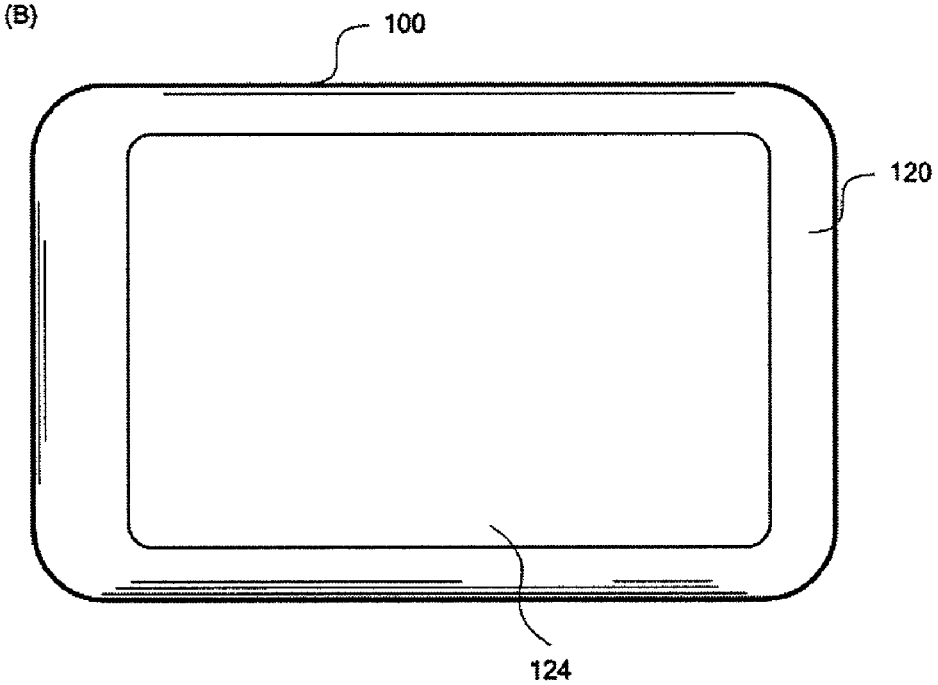

FIG. 6 is view showing an embodiment of the mobile device 100 having touchscreens 112 and 124 respectively disposed on both sides thereof to control their opposite displays. These touchscreens 112 and 124 control cursors displayed on the touchscreens 124 and 112 disposed opposite to each other, respectively. Accordingly, the user can turn over the mobile device 100 to view the other screen while using one screen. To this end, each of the frontpanel touchscreen 112 and the backpanel touchscreen 124 is preferably provided with image display function and touchpad function.

A controller (not shown) allows the position of the cursor inputted to the backpanel touchscreen 124 to be correspondingly displayed on the frontpanel touchscreen 112. If an instruction is inputted to the backpanel touchscreen 124, the controller processes the execution instruction according to the position of the cursor on the frontpanel touchscreen 112. Similarly, the controller allows the position of the cursor inputted to the frontpanel touchscreen 112 to be correspondingly displayed on the backpanel touchscreen 124. If an instruction is inputted to the frontpanel touchscreen 112, the controller processes the execution instruction according to the position of the cursor on the backpanel touchscreen 124. That is, the user controls the cursor displayed on the frontpanel touchscreen 112 through the backpanel touchscreen 124 while viewing the frontpanel touchscreen 112. By turning over the mobile device 100, the user controls the cursor displayed on the backpanel touchscreen 124 through the frontpanel touchscreen 112 while viewing the backpanel touchscreen 124.

The manner of alternately viewing screens disposed on both the sides of the mobile device 100 is useful particularly when the execution of application program or loading of a web-page is slow. That is, while inputting an instruction for connecting to a web-page and then waiting for the loading of the web-page, the user may turn over the mobile device 100 to use other contents. If the web-page is completely loaded, the user again turns over the mobile device 100 to enjoy the loaded web-page.

Meanwhile, it is possible to use the mobile device 100 in a state where the display and touchpad functions of the touchscreens 112 and 124 disposed on both the sides of the mobile device 100 are all activated. However, in some cases, it may be convenient to activate only one of the functions for each touchscreen. That is, the user may set the cursor to be controlled through the backpanel touchscreen by turning off the touchpad function of the other touchscreen which the user views. At this time, if the display function of the backpanel touchscreen is activated, electric power is wasted, and therefore, the mobile device 100 may be implemented in such a manner that the display function is allowed not to be activated. The functions of the respective touchscreens are set to be opposite to each other when the mobile device 100 is turned over.

To this end, the controller controls the image display functions of the frontpanel and backpanel touchscreens 112 and 124 to be alternately switched under the operation of the user. While the touchpad function of one touchscreen having the activated display function is inactivated, the touchpad function of the other screen having the inactivated display function is activated. A sensor for detecting the turnover of the mobile device 100 may be installed to the mobile device 100, and a switching button may be provided in the mobile device 100. In addition, a switching menu may be embedded in a touchscreen menu.

According to the present invention, a touchpad is disposed on a back side of a mobile device, so that the mobile device can be controlled through a contact point at which a user's finger is naturally positioned when a user holds the mobile device with a user's hand. Further, the operation is performed on the back side of the mobile device, so that a display screen is not covered with the user's finger. Furthermore, the position of a cursor can be delicately controlled, and accordingly, it is particularly advantageous in full-browsing web services.

What is claimed is:

1. A mobile device, comprising:
   a frontpanel touchscreen disposed on a front side of said mobile device, the frontpanel touchscreen having an image display function and a touchpad function;
   a backpanel touchscreen disposed on a back side of said mobile device, the backpanel touchscreen having the image display function and the touchpad function; and
   a controller that displays a cursor on said frontpanel touchscreen, cursor operations of the frontpanel cursor are provided on said backpanel touchscreen, and receives an execution instruction on said backpanel touchscreen so as to process the execution instruction corresponding to a cursor position of the execution instruction on said frontpanel touchscreen, said controller further displaying a cursor on said backpanel touchscreen, cursor operations of the backpanel cursor being provided on said frontpanel touchscreen, and said controller receiving an execution instruction on said frontpanel touchscreen so as to process the execution instruction corresponding to a cursor position of the execution instruction on said backpanel touchscreen.

2. The mobile device as claimed in claim 1, wherein said controller alternately switches the image display and touchpad functions of said frontpanel and backpanel touchscreens, such that when said controller inactivates the touchpad function and activates the image display function for one of said frontpanel and backpanel touchscreens, said controller activates the touchpad function and inactivates the display function for an other of said frontpanel and backpanel touchscreens.

3. A mobile device, comprising:
- a frontpanel touchscreen disposed on a front side of said mobile device, the frontpanel touchscreen having an image display function and a touchpad function for a first application;
- a backpanel touchscreen having a size corresponding to the frontpanel touchscreen and disposed on a back side of said mobile device, the backpanel touchscreen having an image display function and a touchpad function for a second application; and
- a controller, wherein:
  - when an effective content for the first application is provided on said frontpanel touchscreen, the controller displays a cursor on said frontpanel touchscreen, cursor operations of the front panel cursor being provided on said backpanel touchscreen, and receives an execution instruction on said backpanel touchscreen so as to process the execution instruction corresponding to a front panel cursor position of the execution instruction on said frontpanel touchscreen, and
  - when an effective content for the second application is provided on said backpanel touchscreen, the controller displays a cursor on said backpanel touchscreen, cursor operations of the backpanel cursor being provided on said frontpanel touchscreen, and receives an execution instruction on said frontpanel touchscreen so as to process the execution instruction corresponding to a backpanel cursor position of the execution instruction on said backpanel touchscreen.

4. The mobile device as claimed in claim 3, wherein said controller alternately switches the image display and touchpad functions of said frontpanel and backpanel touchscreens, such that when said controller inactivates the touchpad function and activates the image display function for one of said frontpanel and backpanel touchscreens, said controller activates the touchpad function and inactivates the display function for an other of said frontpanel and backpanel touchscreens.

* * * * *